United States Patent [19]

Keller et al.

[11] 4,298,359
[45] Nov. 3, 1981

[54] CENTRIFUGAL SEPARATOR HAVING HEAT TRANSFER MEANS

[75] Inventors: Egon Keller, Aarbergen; Peter Kreutz, Neuss, both of Fed. Rep. of Germany

[73] Assignee: Passavant-Werke Michelbacher Huette, Aarbergen, Fed. Rep. of Germany

[21] Appl. No.: 161,753

[22] Filed: Jun. 23, 1980

[30] Foreign Application Priority Data

Jun. 23, 1979 [DE] Fed. Rep. of Germany ... 7918099[U]

[51] Int. Cl.³ .................. B04C 3/02; B01D 45/12
[52] U.S. Cl. ........................ 55/269; 55/349; 210/512.2
[58] Field of Search ............. 55/204, 205, 269, 200, 55/202, 208, 345, 346, 349; 210/512, 512 M, 175

[56] References Cited

U.S. PATENT DOCUMENTS

| | | | |
|---|---|---|---|
| 1,362,251 | 12/1920 | Kellogg | 55/269 |
| 1,720,536 | 7/1929 | Young | 55/269 |
| 2,437,294 | 3/1948 | Dalin | 55/269 |
| 2,955,916 | 10/1960 | Guyer et al. | 55/204 X |
| 3,336,017 | 8/1967 | Kopa | 55/269 |
| 3,559,811 | 2/1971 | Dahlberg | 210/512.2 |
| 3,948,771 | 4/1976 | Bielefeldt | 210/512.2 |

Primary Examiner—John Adee
Attorney, Agent, or Firm—Woodford R. Thompson, Jr.

[57] ABSTRACT

Apparatus for separating liquid and/or solid particles suspended in a gaseous and/or vaporous media stream centrifugally has a curved channel through which the media stream flows. A turbulence chamber is connected to the concave side of the curved channel and accommodates a partial stream of the media stream and has at least one discharge opening for particles separated from the partial stream and at least one exhaust opening for the particle free fraction of the partial stream. At least one of the walls of the curved channel and the turbulence chamber has a cavity for the passage of a heat transfer medium.

2 Claims, 3 Drawing Figures

CENTRIFUGAL SEPARATOR HAVING HEAT TRANSFER MEANS

BACKGROUND OF THE INVENTION

This invention relates to apparatus for separating liquid and/or solid particles suspended in a gaseous and/or vaporous media stream by means of centrifugal force.

Heretofore, in the production and purification of outgoing air and waste gas, the separation of particles out of a stream of gas and/or vapor has been accomplished by employing various systems. These systems have always attempted to achieve an optimum degree of separation with the lowest possible outlay in apparatus and energy. Apparatus which attempts to accomplish these desires is disclosed in German patent No. DE-OS 2 206 318. This patent discloses, substantially, a curved channel with a turbulence chamber connected to the concave side thereof, which accommodates a part of the medium stream flowing through the channel. In the continuing turbulence driven by the onflowing medium stream, the particles become separated from the carrier medium at the periphery and are discharged axially through at least one discharge opening, whereas the carrier medium is exhausted axially through at least one exhaust opening at the center of the turbulence.

SUMMARY OF THE INVENTION

In accordance with the present invention the above mentioned system is further improved in that the walls of the curved channel and/or of the turbulence chamber are provided with cavities for the passage of a heat transfer medium. For this purpose the walls or wall sections may either be of double-walled construction or be equipped with externally attached pipe coils. An advantage in our improved apparatus lies in the fact that the media stream can also be subjected to a thermal treatment during the separation process. The heat transfer in this case is particularly high because the contact between the highly turbulent eddy and the heat-transmitting walls is particularly intensive. Accordingly, our improved apparatus can be used for numerous new practical applications, such as for the cooling of waste gas and outgoing air, for the preheating of drying or combustion air, for the dehydration of gas/vapor mixtures by cooling below the dew point, or for the inverse process, namely the generation of supersaturated steam by superheating. Our apparatus is particularly economical in saving energy, in the case of drying or heating processes, because the hot outgoing air surrenders its heat to the incoming air with simultaneous purification.

Our separator apparatus is particularly adapted for a multiple arrangement in series or parallel connection. The series arrangement is particularly preferable when relatively small media streams are required to be thoroughly purified due to the fact that practically total separation of the particles from the carrier medium is achieved by the long dwell time of the partial stream in each turbulence chamber placed further downstream. As a further improvement of our apparatus it is proposed, for such a series or staggered arramgement of a plurality of separator devices with each comprising a curved channel and a turbulence chamber, that at least one section of the wall of a turbulence chamber and/or one section of the interior wall of the channel simultaneously constitute at least one portion of the exterior wall of the channel of an adjacent separator device, and that such common wall sections be of doube-walled construction. By this dual function of the common wall sections, the heat transfer medium is impinged upon from both sides. Since the cavities can be flowed both in direct current and also in counter current or cross current, an optimum heat transfer can be achieved for each individual application.

Our separator device for the series arrangement can be further constructed particularly advantageously wherein, in each case, the wall of the turbulence chamber and the interior wall of the continuing channel section constitute one component with the external contour of which is shaped so that it constitutes the exterior wall of the channel of the adjacent separator device, and wherein this component is of double-walled construction at least in those sections common to the two adjacent separator devices. From this basic component, any desired number of separator devices can be mutually aligned in a highly space-saving manner, wherein only the two end walls continuing along the entire row of separator devices remain to be added.

DESCRIPTION OF THE DRAWING

Apparatus embodying features of our invention is illustrated in the accompanying drawings forming a part of this application, in which.

Figure 1:
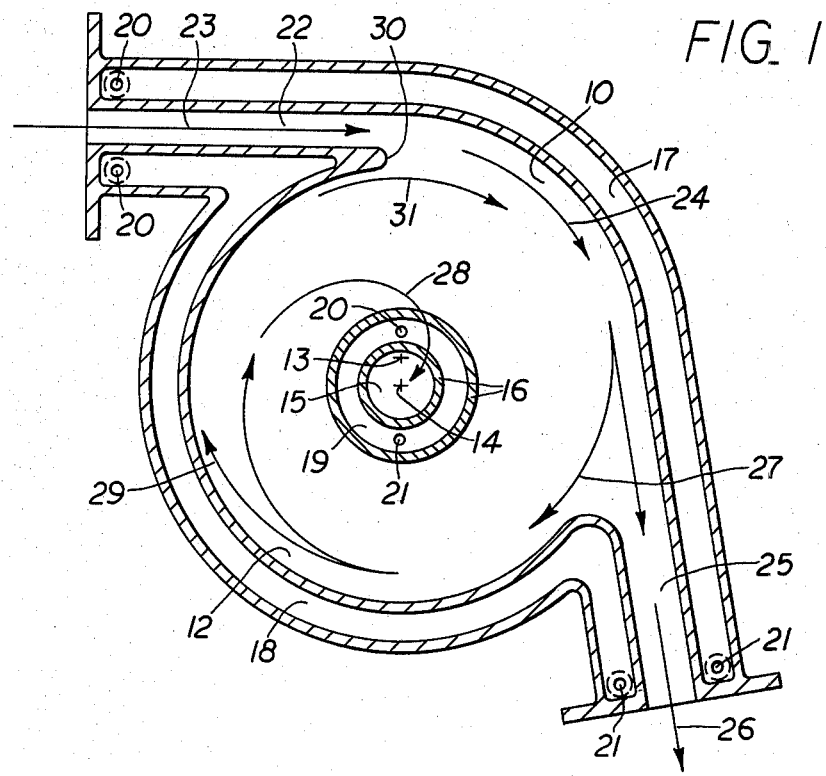
FIG. 1 is a sectional view through one complete separator device.

Referring to the drawings, we show in FIG. 1 the separator device as comprising a curved channel 10 and a turbulence chamber 12 connected to the concave interior side of the curved channel 10. The curvature of the channel 10 extends through an angle of approximately 80°. Due to the fact that the center of the curvature 13 of the curved channel 10 is located eccentrically relative to the center 14 of the cylindrical turbulence chamber 12, the open transition region is greater than 80° and is shown as being approximately 130°.

The turbulence chamber 12 is provided at its end face with at least one axially oriented and centrally arranged exhaust opening 15, which is surrounded by an immersion tube 16. A second exhaust opening may be placed in the opposite face of the turbulence chamber 12 in mirror-image relationship to the exhaust opening 15.

All of the walls, including the walls of the immersion tube 16, are of double-walled construction so as to provide cavities 17, 18, and 19, as shown in FIG. 1. Suitable supply and discharge openings 20 and 21, respectively, communicate with the cavities 17, 18 and 19 for circulating a heat transfer medium therethrough.

In operation the media stream laden with the particles to be separated enters the separator device through the inlet-side section 22 of the curved channel 10 in the direction of arrow 23. During the change of direction in the curved channel section, indicated by arrow 24, the heavier particles accumulate in the outer channel region, so that they leave the separator device with the principal fraction of the media stream through the outlet-side section 25 of the curved channel in the direction of arrow 26. Due to the pure air exhaustion through the exhaust opening 15, a fraction of the media stream corresponding to this quantity, and containing the finer particles, is deflected in the direction of curvature, indicated by arrow 27, with the direction of curvature being maintained into the turbulence chamber 12. This partial stream forms in the turbulence chamber 12 a continuing high velocity rotating turbulence which obtains its drive from the media stream flowing past in the curved channel 10. In the orbit which represents many revolutions and which finally terminates in the exhaust opening 15, as indicated by arrow 28, the finer particles are driven outwardly by centrifugal force and ultimately reach the wall of the turbulence chamber 12, as indicated by arrow 29. The finer particles then slide onto the outflow edge 30, where they enter the principal stream in the direction of arrow 31 and are discharged thereby.

The heat transfer medium circulating in the cavities 17, 18 and 19 can surrender or absorb large quantities of heat by the highly turbulent contact between the media streams and the walls. The particles sliding along the walls, which may also be condensed drops of vapor, may also be subjected to an intensive temperature change.

Figure 2:
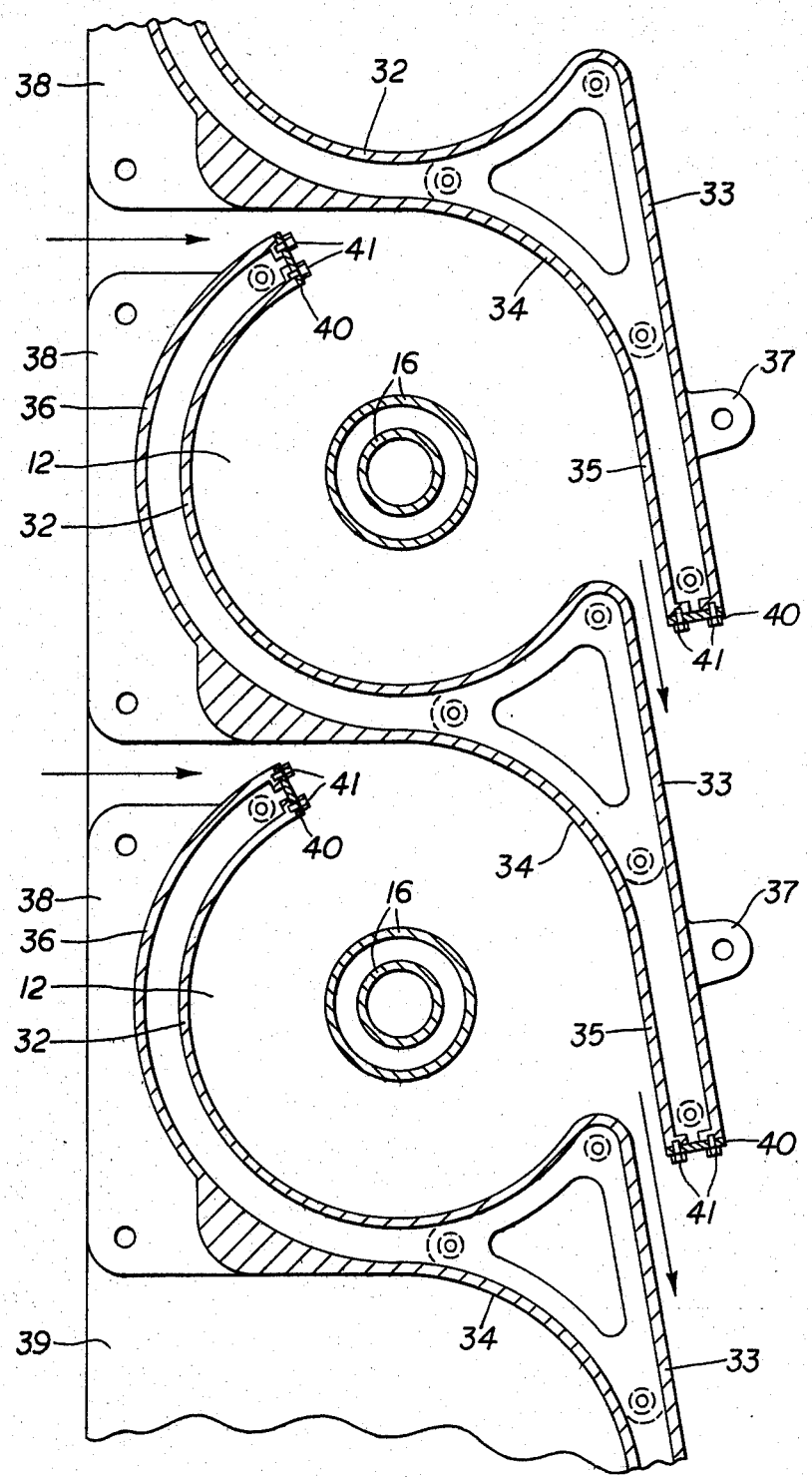
FIG. 2 is a sectional view through two components of a series or staggered arrangement of a plurality of separator devices; and, FIG. 3 is a sectional view through another form of our invention wherein externally attached pipe coils are employed instead of the double-walled construction.

The component illustrated in FIG. 2, and preferably produced from cast iron, is a series-produced article which, when mutually aligned, produces a battery arrangement. The single inner wall of the double-shelled component comprises a curved section 32 of circular arcuate configuration which surrounds the turbulence chamber 12, and a rectilinear section 33. The outer wall of the double wall component includes an intermediate section 34 which is curved in the opposite direction from curved section 32 and extends between a curved section 36 and a rectilinear section 35. In a staggered arrangement of a plurality of such components, the intermediate section 34 of the outer wall constitutes the exterior wall of the curved channel section of the subjacent separation device, as shown in FIG. 2. The cavity carrying the heat transfer medium is therefore defined between the inner and outer walls and is washed by the media stream on a very large section on both sides.

The component shown in FIG. 2 has on its end faces outwardly projecting lugs 37 and flanges 38, to which end walls 39, which carry the immersion tubes 16, can be attached. The cavity defined between the inner and outer walls, which is open at its narrow sides for technical casting reasons, is closed by covers 40 which are secured in place by screws 41.

Figure 3:
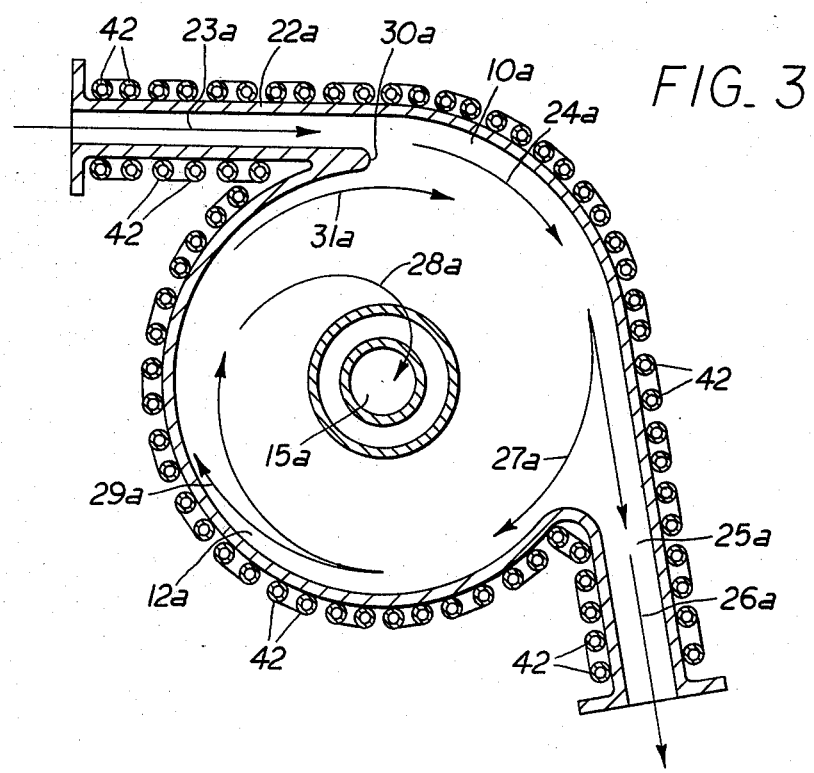

The embodiment shown in FIG. 3 is similar to the embodiment shown in FIG. 1 and comprises a curved channel $10^a$ and a turbulence chamber $12^a$ connected to the concave interior side of the curved channel $10^a$. The media stream laden with the particles to be separated enters the separator device through an inlet-side section $22^a$ of the curved channel $10^a$ in the direction of the arrow $23^a$. During the change of direction in the curved channel $10^a$, indicated by arrow $24^a$ the heavier particles move into the outer channel region and exit through an outlet-side section $25^a$ in the direction of arrow $26^a$. The finer particles are deflected in the direction of arrow $27^a$, as described hereinabove relative to the embodiment shown in FIG. 1, and are discharged through opening $15^a$, as indicated by arrow $28^a$. The finer particles also move in the direction of the arrow $29^a$ and then slide onto the outflow edge $30^a$ where they enter the principal stream, indicated by arrow $31^a$.

Instead of providing a double walled construction as shown in FIG. 1, the separator device shown in FIG. 3 is equipped with suitable externally attached pipe coils 42 for receiving the heat transfer medium.

What is claim is:

1. Apparatus for separating liquid and/or solid particles suspended in a gaseous and/or vaporous media stream by means of centrifugal force having a curved channel defined by a wall and through which the media stream flows and having a turbulence chamber defined by a wall and connected to the concave side of the curved channel and accommodating a partial stream of the media stream, and having at least one discharge opening for the particles separated from the partial stream and at least one exhaust opening for the particle-free fraction of the partial stream, with at least one of the walls of the curved channel and the turbulence chamber being provided with a cavity for the passage of a heat or cooling transfer medium and said apparatus embodies a plurality of separator devices arranged in staggered relationship to each other with each comprising a curved channel and a turbulence chamber, the improvement in that at least one section of the wall of a turbulence chamber and one section of the interior wall of said channel, simultaneously constitutes at least one section of the exterior wall of the channel of an adjacent separator device, and defines common wall sections of double-walled construction.

2. Apparatus as defined in claim 1 in which inner and outer sections of the turbulence chamber and the adjacent inner and outer walls of said channel constitute a component, the external contour of which is shaped so that it constitutes the exterior walls of the curved channel of an adjacent separator device, and that said component is of double-walled construction at least in those sections common to the two separator devices.

* * * * *